US010695870B2

United States Patent
Kobayashi et al.

(10) Patent No.: US 10,695,870 B2
(45) Date of Patent: Jun. 30, 2020

(54) LASER PROCESSING APPARATUS

(71) Applicant: DISCO CORPORATION, Tokyo (JP)

(72) Inventors: Yutaka Kobayashi, Tokyo (JP); Taiki Sawabe, Tokyo (JP); Hidetoshi Mannami, Tokyo (JP); Kohei Tanaka, Tokyo (JP); Wakana Onoe, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 202 days.

(21) Appl. No.: 15/921,137

(22) Filed: Mar. 14, 2018

(65) Prior Publication Data

US 2018/0264599 A1 Sep. 20, 2018

(30) Foreign Application Priority Data

Mar. 14, 2017 (JP) ................. 2017-048574

(51) Int. Cl.
*B23K 26/38* (2014.01)
*B23K 26/03* (2006.01)
*B23K 26/08* (2014.01)
*B23K 26/035* (2014.01)
*B23K 101/40* (2006.01)

(52) U.S. Cl.
CPC ............ *B23K 26/38* (2013.01); *B23K 26/032* (2013.01); *B23K 26/035* (2015.10); *B23K 26/0876* (2013.01); *B23K 2101/40* (2018.08)

(58) Field of Classification Search
CPC .... B23K 26/38; B23K 26/035; B23K 26/032; B23K 26/0876; B23K 2101/40

USPC ............ 219/121.67, 121.73, 121.75, 121.78, 219/121.83

See application file for complete search history.

(56) References Cited

U.S. PATENT DOCUMENTS

2015/0034617 A1* 2/2015 Sawabe .............. B23K 26/0608
219/121.73

FOREIGN PATENT DOCUMENTS

| JP | 10305420 A | 11/1998 |
| JP | 2002192370 A | 7/2002 |
| JP | 2014221483 A | 11/2014 |

* cited by examiner

*Primary Examiner* — Phuong T Nguyen
(74) *Attorney, Agent, or Firm* — Greer Burns & Crain Ltd.

(57) ABSTRACT

A laser processing apparatus includes a controller having (a) a section for storing the Y coordinate of a characteristic point having a predetermined positional relation to each division line formed on a wafer as a reference value with respect to a reference position where the focal point of a laser beam coincides with a predetermined position on each division line, (b) a section for detecting the amount of deviation of the Y coordinate of the characteristic point after indexing each division line of the wafer in the Y direction by the operation of a Y moving unit, from the Y coordinate stored as the reference value, and (c) a section for determining whether or not the amount of deviation detected is greater than an allowable value.

8 Claims, 4 Drawing Sheets

LASER PROCESSING APPARATUS

BACKGROUND OF THE INVENTION

Field of the Invention

The present invention relates to a laser processing apparatus capable of detecting the deviation of the focal position of a laser beam from the center of each division line of a wafer in an indexing direction during laser processing to the wafer, and then correcting an index amount by the amount of this deviation detected, thereby maintaining the laser processing with high accuracy.

Description of the Related Art

A plurality of devices such as integrated circuits (ICs) and large-scale integrations (LSIs) are formed on the front side of a wafer so as to be separated by a plurality of crossing division lines. The wafer thus having the plural devices on the front side is divided into individual device chips corresponding to the plural devices by using a laser processing apparatus. The device chips thus obtained are used in various kinds of electrical equipment such as mobile phones and personal computers. The laser processing apparatus includes a chuck table for holding the wafer, laser beam applying means having focusing means for applying a laser beam to the wafer held on the chuck table, alignment means for imaging the wafer held on the chuck table and making the focal position of the laser beam to be focused by the focusing means coincide with the position of each division line, X moving means for relatively moving the chuck table and the laser beam applying means in an X direction as a feeding direction, Y moving means for relatively moving the chuck table and the laser beam applying means in a Y direction as an indexing direction perpendicular to the X direction, and control means for controlling these components.

The laser processing apparatus has various types to be suitably selected according to the kind, material, target processing quality, etc. of the wafer. For example, the following three types of the laser processing apparatus are known. The first type is the type of applying a pulsed laser beam having an absorption wavelength to a workpiece to thereby form a groove on the workpiece along each division line by ablation, thus dividing the workpiece into individual device chips (see Japanese Patent Laid-Open No. 1998-305420, for example). The second type is the type of applying a laser beam having a transmission wavelength to a workpiece in the condition where the focal point of the laser beam is set inside the workpiece to thereby form a modified layer inside the workpiece along each division line, and next applying an external force to the workpiece to thereby divide the workpiece into individual device chips (see Japanese Patent No. 3408805, for example). The third type is the type of applying a laser beam having a transmission wavelength to a workpiece in the condition where the focal area of the laser beam is set inside the workpiece at a position corresponding to each division line to thereby form a plurality of shield tunnels along each division line, each shield tunnel extending from the front side of the workpiece to the back side thereof, each shield tunnel including a fine hole and an amorphous region surrounding the fine hole, thus dividing the workpiece into individual device chips (see Japanese Patent Laid-Open No. 2014-221483, for example).

SUMMARY OF THE INVENTION

By suitably selecting these types of the laser processing apparatus, various wafers requiring different processing conditions can be properly laser-processed. However, in all the types of the laser processing apparatus, there arises the following problem. When the laser beam is applied to the wafer along each division line, a portion of the wafer irradiated with the laser beam is minutely expanded. As a result, in performing the laser processing along the plurality of division lines on the wafer, the focal point of the laser beam to be focused by the focusing means is gradually deviated in the Y direction as an indexing direction perpendicular to the X direction as a feeding direction where the laser beam is scanned. As a result, the laser processing cannot be accurately performed along each division line.

In particular, the rate of expansion in the wafer due to the application of the laser beam is greater in the laser processing apparatus of the type of applying a laser beam having a transmission wavelength to the wafer in the condition where the focal point of the laser beam is set inside the wafer to thereby form a modified layer inside the wafer along each division line, as compared with the other types of the laser processing apparatus. Accordingly, the problem of the deviation mentioned above is remarkable in this type of the laser processing apparatus.

Further, in this type of the laser processing apparatus for forming a modified layer along each division line, the modified layer formed inside the wafer cannot be visually recognized and it is therefore difficult to accurately grasp the focal position of the laser beam. Accordingly, the amount of deviation of the modified layer with respect to each division line cannot be detected, so that an index amount as the amount of indexing the wafer in the Y direction cannot be corrected by detecting the deviation during the laser processing to the wafer.

It is therefore an object of the present invention to provide a laser processing apparatus which can detect the deviation between the focal point (spot) of the laser beam and each division line during the laser processing to the wafer, thereby performing the laser processing with high accuracy.

In accordance with an aspect of the present invention, there is provided a laser processing apparatus including a chuck table for holding a wafer having a plurality of devices formed on the front side so as to be separated by a plurality of crossing division lines; laser beam applying means for applying a laser beam to the wafer held on the chuck table; imaging means for imaging the wafer held on the chuck table; X moving means for relatively feeding the chuck table and the laser beam applying means in an X direction; Y moving means for relatively indexing the chuck table and the laser beam applying means in a Y direction perpendicular to the X direction; and control means for controlling the chuck table, the laser beam applying means, the imaging means, the X moving means, and the Y moving means, the laser beam applying means including a laser oscillator for oscillating the laser beam, and focusing means for focusing the laser beam oscillated from the laser oscillator and applying the laser beam to each division line of the wafer held on the chuck table, the control means including a coordinate storing section for storing the Y coordinate of a characteristic point having a predetermined positional relation to each division line as a reference value with respect to a reference position where the focal point of the laser beam to be focused by the focusing means coincides with a predetermined position on each division line in the Y direction, a deviation detecting section for detecting the amount of deviation of the Y coordinate of the characteristic point imaged by the imaging means after indexing each division line of the wafer in the Y direction by the operation of the Y moving means, from the Y coordinate stored as the reference value in the coordinate storing section, and a determining section for determining whether or not the amount of deviation detected by the deviation detecting section is greater than an allowable value, wherein when the determining section determines that the amount of deviation is greater than the allowable value, an index amount as the amount of indexing each division line is corrected by the amount of deviation in the Y direction by the operation of the Y moving means, and the index amount corrected is used in next indexing the wafer.

Preferably, the deviation detecting section is operated during laser processing while the wafer held on the chuck table and the focusing means are being relatively moved in the X direction. Preferably, the imaging means includes an imaging element, an objective lens, and a strobe light source for forming a still image of the wafer, the still image being formed during laser processing while the wafer held on the chuck table and the focusing means are being relatively moved in the X direction.

Preferably, the laser beam to be applied from the focusing means is a laser beam having a transmission wavelength to the wafer, and the laser beam is applied to the wafer along each division line in the condition where the focal point of the laser beam to be focused by the focusing means is set inside the wafer, thereby forming a modified layer inside the wafer along each division line. Preferably, the wafer is held on the chuck table in the condition where the back side of the wafer is exposed, and the characteristic point formed on the front side of the wafer is imaged through the back side of the wafer by the imaging means. Preferably, the deviation detecting section is operated during laser processing along an arbitrary one of the division lines. Alternatively, the deviation detecting section is operated during laser processing along each division line.

Preferably, the laser processing apparatus further includes alignment means for imaging the wafer held on the chuck table and making the focal position of the laser beam to be focused by the focusing means coincide with the center of each division line in the Y direction, the imaging means functioning also as the alignment means.

According to the laser processing apparatus of the present invention, the following effects can be exhibited. Even when the wafer is expanded by the application of the laser beam to the wafer to cause the deviation of the focal position of the laser beam to be focused by the focusing means, from each division line in the Y direction perpendicular to the X direction, the index amount can be immediately corrected by the amount of deviation to thereby maintain high-precision processing.

Further, also in the case that the laser processing is of such a type that a modified layer is formed inside the wafer along each division line, the Y coordinate of the characteristic point adjacent to each division line is detected to thereby detect the amount of deviation of the focal point from the center of each division line. Then, the index amount is corrected by the amount of deviation detected above. Accordingly, it is unnecessary to actually detect the position of the modified layer formed inside the wafer, and the index amount can be corrected during the laser processing to the wafer.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
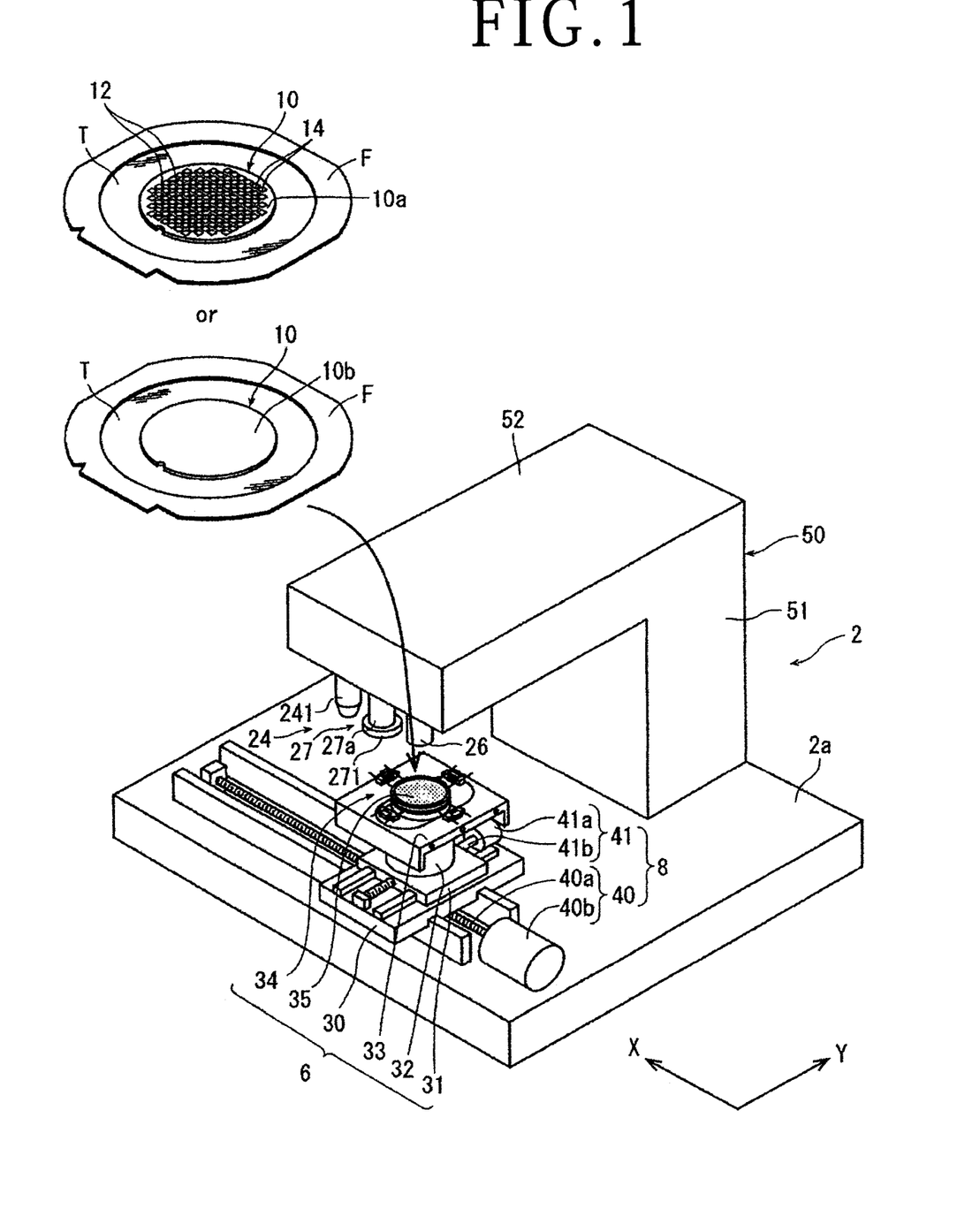
FIG. 1 is a perspective view of a laser processing apparatus according to a preferred embodiment of the present invention.

A preferred embodiment of the laser processing apparatus according to the present invention will now be described in detail with reference to the attached drawings. Referring to FIG. 1, there is shown a laser processing apparatus 2 in perspective according to this preferred embodiment. There is also shown an enlarged perspective view of a wafer 10 as a workpiece to be processed by the laser processing apparatus 2. The laser processing apparatus 2 shown in FIG. 1 includes a stationary base 2a, holding means 6 for holding the wafer 10, moving means 8 provided on the stationary base 2a for moving the holding means 6, laser beam applying means 24 for applying a laser beam to the wafer 10 held by the holding means 6, and an L-shaped casing 50 provided on the stationary base 2a at its rear end portion. The L-shaped casing 50 includes a vertical portion 51 extending upward from the upper surface of the stationary base 2a at its rear end portion behind the moving means 8 and a horizontal portion 52 extending from the upper end of the vertical portion 51 in a horizontal direction toward a position above the moving means 8. The laser beam applying means 24 includes an optical system for applying a laser beam to the wafer 10 held by the holding means 6 and first and second imaging means 26 and 27 for imaging the wafer 10 held by the holding means 6.

The optical system of the laser beam applying means 24 includes laser beam generating means (not shown in FIG. 1) built in the horizontal portion 52 of the casing 50 and focusing means 241 provided on the lower surface of the horizontal portion 52 at its front end portion. The first imaging means 26 is also provided on the lower surface of the horizontal portion 52 of the casing 50 so as to be spaced from the focusing means 241 in the X direction shown by an arrow X in FIG. 1. The first imaging means 26 functions to perform alignment. The second imaging means 27 is also provided on the lower surface of the horizontal portion 52 of the casing 50 adjacent to the first imaging means 26 so as to be spaced therefrom in the X direction. The second imaging means 27 functions to detect the amount of deviation to be hereinafter described. As shown in FIG. 1, the wafer 10 is previously supported through an adhesive tape T to an annular frame F. The wafer 10 thus supported through the adhesive tape T to the annular frame F is held by the holding means 6. The wafer 10 has a front side 10a and a back side 10b opposite to the front side 10a. A plurality of crossing division lines 12 are previously formed on the front side 10a of the wafer 10 to thereby define a plurality of separate regions where a plurality of devices 14 are formed. Thus, the plural devices 14 are previously formed on the front side 10a of the wafer 10 so as to be separated from each other by the plural division lines 12. As shown in FIG. 1, the back side 10b of the wafer 10 may be attached to the adhesive tape T or the front side 10a of the wafer 10 may be attached to the adhesive tape T. In the case that the back side 10b of the wafer 10 is attached to the adhesive tape T, the wafer 10 is held through the adhesive tape T by the holding means 6 in the condition where the front side 10a of the wafer 10 is oriented upward. On the other hand, in the case that the front side 10a of the wafer 10 is attached to the adhesive tape T, the wafer 10 is held through the adhesive tape T by the holding means 6 in the condition where the back side 10b of the wafer 10 is oriented upward. In this preferred embodiment, the front side 10a of the wafer 10 is attached to the adhesive tape T, and the wafer 10 is held through the adhesive tape T by the holding means 6 in the condition where the back side 10b of the wafer 10 is oriented upward.

The holding means 6 includes a rectangular X movable plate 30 mounted on the base 2a so as to be movable in the X direction, a rectangular Y movable plate 31 mounted on the X movable plate 30 so as to be movable in the Y direction shown by an arrow Y, a cylindrical support 32 fixed to the upper surface of the Y movable plate 31, and a rectangular cover plate 33 fixed to the upper end of the support 32. The cover plate 33 is provided with a bellows member (not shown) extending in the X direction. The cover plate 33 has an elongated hole extending in the Y direction. A cylindrical chuck table 34 is rotatably supported to the support 32 so as to extend through the elongated hole of the cover plate 33. The chuck table 34 functions to hold the wafer 10 thereon. The chuck table 34 is rotatable about its vertical axis by rotational drive means (not shown) provided in the support 32. The chuck table 34 has an upper surface on which a circular vacuum chuck 35 is provided. The vacuum chuck 35 is formed of a porous material and it has a substantially horizontal holding surface for holding the wafer 10 under suction. The vacuum chuck 35 is connected through a suction line (not shown) to suction means (not shown) for supplying a vacuum, wherein the suction line is formed so as to pass through the support 32. The X direction is defined as the direction shown by the arrow X in FIG. 1, and the Y direction is defined as the direction shown by the arrow Y in FIG. 1, which is perpendicular to the X direction in an XY plane. The XY plane defined by the X direction and the Y direction is a substantially horizontal plane.

The moving means 8 includes X moving means 40 for moving the X movable plate 30 in the X direction and Y moving means 41 for moving the Y movable plate 31 in the Y direction. The X moving means 40 includes a ball screw 40a extending in the X direction and a motor 40b for rotating the ball screw 40a. The ball screw 40a is operatively connected to the X movable plate 30. The X moving means 40 is operated in such a manner that the rotary motion of the motor 40b is converted into a linear motion by the ball screw 40a and this linear motion is transmitted to the X movable plate 30, so that the X movable plate 30 is moved in the X direction along a pair of guide rails provided on the base 2a. Similarly, the Y moving means 41 includes a ball screw 41a extending in the Y direction and a motor 41b for rotating the ball screw 41a. The ball screw 41a is operatively connected to the Y movable plate 31. The Y moving means 41 is operated in such a manner that the rotary motion of the motor 41b is converted into a linear motion by the ball screw 41a and this linear motion is transmitted to the Y movable plate 31, so that the Y movable plate 31 is moved in the Y direction along a pair of guide rails provided on the X movable plate 30. Although not shown, the X moving means 40, the Y moving means 41, and the rotational drive means are each provided with position detecting means. The position detecting means in the X moving means 40 functions to accurately detect the X position of the chuck table 34. The position detecting means in the Y moving means 41 functions to accurately detect the Y position of the chuck table 34. The position detecting means in the rotational drive means functions to accurately detect the rotational position of the chuck table 34. Detection signals from these pieces of position detecting means are transmitted to control means (not shown). According to control signals output from the control means, all of the X moving means 40, the Y moving means 41, and the rotational drive means can be driven to move the chuck table 34 to an arbitrary position and rotate it at an arbitrary angle.

The first imaging means 26 is provided on the lower surface of the horizontal portion 52 of the casing 50 at its front end portion so as to be spaced from the focusing means 241 in the X direction. Although not shown, the first imaging means 26 includes an ordinary imaging element (charge-coupled device (CCD)) for imaging the wafer 10 by using visible light, infrared light applying means for applying infrared light to the wafer 10, an optical system for capturing the infrared light applied by the infrared light applying means, and an imaging element (infrared CCD) for outputting an electrical signal corresponding to the infrared light captured by the optical system. The first imaging means 26 is connected to control means 20 (see FIG. 2) to be hereinafter described.

Figure 2:
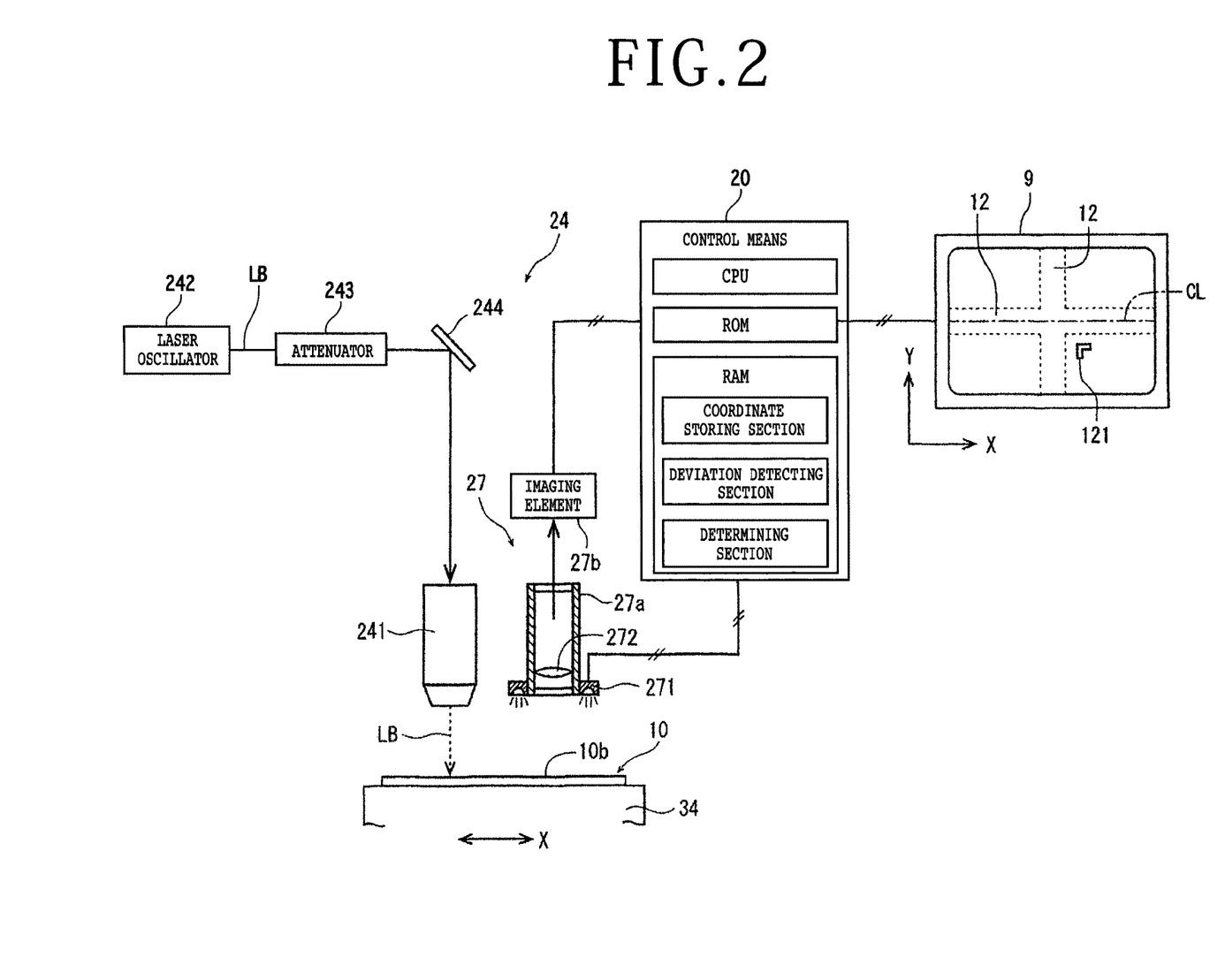
FIG. 2 is a block diagram for illustrating the configuration of laser beam applying means, control means, and display means included in the laser processing apparatus shown in FIG. 1.

The second imaging means 27 is also provided on the lower surface of the horizontal portion 52 of the casing 50 at its front end portion so as to be juxtaposed to the focusing means 241 in the X direction. The second imaging means 27 functions to image the division lines 12 and the devices 14 adjacent thereto on the front side 10a of the wafer 10 held on the chuck table 34 of the holding means 6. As shown in FIG. 2, the second imaging means 27 includes a cylindrical case 27a, ring-shaped illuminating means 271 mounted on the outer circumference of the cylindrical case 27a at its lower end, the illuminating means 271 having a plurality of strobe light sources capable of emitting visible light and infrared light, an objective lens 272 provided in the case 27a, an ordinary imaging element (CCD) (not shown) for imaging the wafer 10 by using visible light, and an imaging element (infrared CCD) 27b located near the upper end of the case 27a for outputting an electrical signal corresponding to the infrared light captured by the objective lens 272.

The laser beam applying means 24 will now be described in more detail with reference to FIG. 2. In FIG. 2, the first imaging means 26 included in the laser beam applying means 24 is not shown. As shown in FIG. 2, the laser beam applying means 24 includes a laser oscillator 242, an attenuator 243, a reflection mirror 244, and the focusing means 241. The laser oscillator 242 functions to oscillate a laser beam LB having a transmission wavelength of 1064 nm to the wafer 10 formed of silicon (Si). The attenuator 243 functions to adjust the power of the laser beam LB oscillated from the laser oscillator 242 by adjusting the transmittance. The reflection mirror 244 functions to reflect the laser beam LB adjusted in power to a desired power by the attenuator 243, thereby changing the traveling direction of the laser beam LB toward the focusing means 241. The focusing means 241 includes a focusing lens (not shown) for focusing the laser beam LB reflected by the reflection mirror 244 and applying the focused laser beam LB to the wafer 10 held on the chuck table 34. In FIG. 2, the adhesive tape T attached to the front side 10*a* of the wafer 10 for protecting the wafer 10 is not shown. Further, the annular frame F supporting the wafer 10 through the adhesive tape T is also not shown.

The laser beam applying means 24 further includes the second imaging means 27. The ring-shaped illuminating means 271 and the imaging element 27*b* included in the second imaging means 27 are connected to the control means 20. The plural strobe light sources included in the ring-shaped illuminating means 271 are operated by the control means 20 to emit light toward the wafer 10 held on the chuck table 34, wherein the timing of imaging the wafer 10 by the light emitted from the strobe light sources is controlled by the control means 20. The laser processing apparatus 2 further includes display means 9, which is also connected to the control means 20 as shown in FIG. 2. An image obtained by the imaging element 27*b* through the objective lens 272 is transmitted to the control means 20 and displayed by the display means 9. Further, the display means 9 also displays a center line CL passing through the center of the screen of the display means 9 in the Y direction and extending in the X direction perpendicular to the Y direction. In this preferred embodiment, the focal position of the laser beam LB to be applied from the focusing means 241 is previously adjusted so as to always coincide with the Y coordinate of the center of the image to be displayed on the screen of the display means 9 in the Y direction. That is, when the laser beam LB is applied to the wafer 10 as moving the chuck table 34 in the X direction, a processed mark formed by the laser beam LB passes through the center line CL displayed on the screen of the display means 9.

The control means 20 is configured by a computer. The control means 20 includes a central processing unit (CPU) for computing according to a control program, a read only memory (ROM) previously storing the control program, a random access memory (RAM) for temporarily storing detection values, operation results, etc., an input interface, and an output interface. Although not shown, the control means 20 is connected not only to the first imaging means 26, the second imaging means 27, and the display means 9, but also to various other components of the laser processing apparatus 2, thereby functioning to control the operation of each component.

The operation of the laser processing apparatus 2 having the above configuration will now be described with reference to FIGS. 1 to 4. In performing the laser processing to the wafer 10 as a workpiece, the front side 10*a* of the wafer 10 on which the plural devices 14 are previously formed is attached to the adhesive tape T, and the annular frame F is also attached to the adhesive tape T so as to surround the wafer 10, thereby supporting the wafer 10 through the adhesive tape T to the annular frame F in the condition where the back side 10*b* of the wafer 10 is exposed. The wafer 10 thus supported through the adhesive tape T to the annular frame F is placed on the chuck table 34 and then held under suction on the vacuum chuck 35 in the condition where the back side 10*b* of the wafer 10 is oriented upward. Thereafter, the chuck table 34 is moved by the moving means 8 to the position directly below the first imaging means 26 spaced from the focusing means 241 in the X direction. When the wafer 10 held on the chuck table 34 is positioned directly below the first imaging means 26, infrared light is applied from the first imaging means 26 through the back side 10*b* of the wafer 10 to any one of the division lines 12 formed on the front side 10*a* of the wafer 10, thereby forming an image. Then, image processing such as pattern matching is performed to thereby align the focal position of the laser beam to be applied from the focusing means 241 and the center of the division line 12 as the work position on the wafer 10. The result of this alignment is transmitted to the control means 20 and then stored in the control means 20 (alignment step). The first imaging means 26 and the control means 20 constitute alignment means.

Figure 3A:
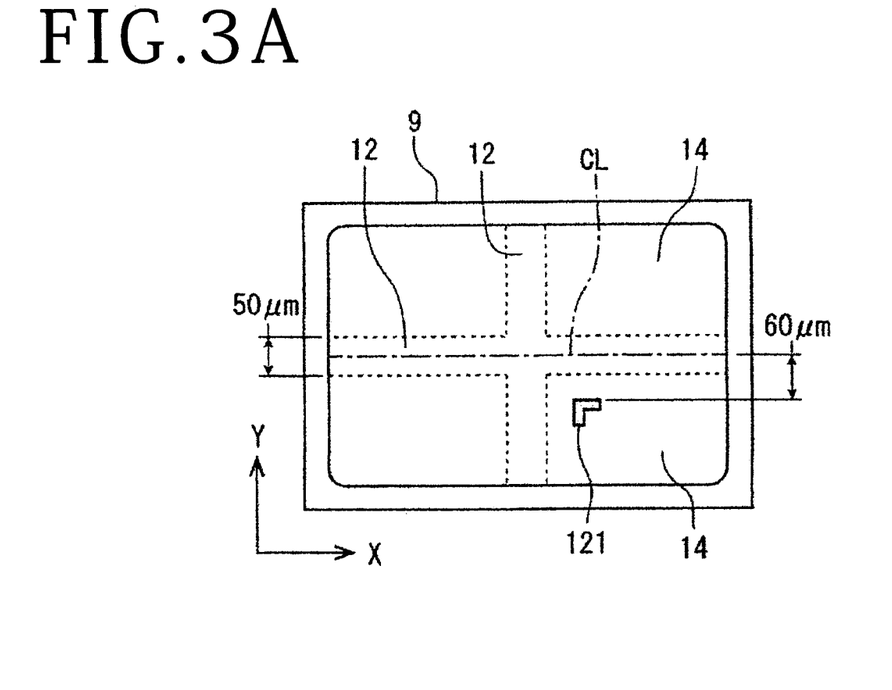
FIGS. 3A and 3B are schematic views for illustrating the deviation of a characteristic point to be detected by the laser beam applying means shown in FIG. 2.
Figure 3B:
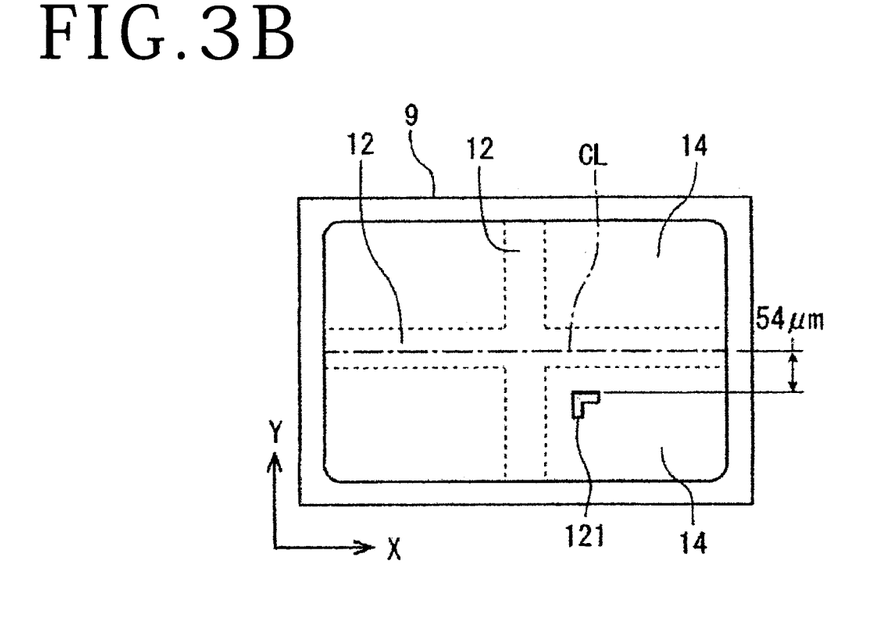

After performing the alignment step by operating the alignment means as mentioned above, the control operation by the control means 20 is performed in the following manner. This control operation will now be described with reference to FIGS. 2, 3A, 3B, and 4. By performing the alignment step mentioned above, the focal position of the laser beam LB to be applied from the focusing means 241 is set on the center of the division line 12. Accordingly, as shown in FIG. 3A, the center line CL passing through the center of the image to be obtained by the second imaging means 27 and displayed on the screen of the display means 9 in the Y direction coincides with the center of the division line 12 in its lateral direction.

In this condition, the center line CL and a characteristic point 121 formed at a predetermined position in any one of the devices 14 are imaged by the second imaging means 27 to detect the Y coordinate of the characteristic point 121. More specifically, as shown in FIG. 3A, the Y coordinate of the center line CL is zero, and the distance between the center line CL and the characteristic point 121 is detected as 60 μm. Accordingly, the Y coordinate of the characteristic point 121 is 60 μm in this case. The characteristic point 121 may be provided by a characteristic pattern formed by the combination of minute elements constituting the device 14. This characteristic pattern is formed at a predetermined position in each of all the devices 14 formed on the wafer 10. As shown in FIG. 3A, each division line 12 has a width of 50 μm.

After detecting the Y coordinate of the characteristic point 121 according to the image obtained by the second imaging means 27 as mentioned above, the detected value for the Y coordinate of the characteristic point 121 is transmitted to the control means 20. As shown in FIG. 2, the RAM in the control means 20 includes a coordinate storing section, a deviation detecting section, and a determining section. The detected value for the Y coordinate of the characteristic point 121 is stored as a reference value Y0 (=60 μm) for the Y coordinate of the characteristic point 121 into the coordinate storing section of the control means 20 (step S1).

After executing the step S1 to store the reference value Y0 (=60 μm) for the Y coordinate of the characteristic point 121 into the coordinate storing section of the control means 20 as mentioned above, the moving means 8 is operated according to the position information obtained in the alignment step mentioned above to thereby move the chuck table 34 so that one end (processing start position) of a target one of the division lines 12 of the wafer 10 is positioned directly below the focusing means 241. Thereafter, the focal point of the laser beam to be applied from the focusing means 241 is set inside the wafer 10 at the center of the target division line 12 in its lateral direction. Thereafter, the laser oscillator 242 and the attenuator 243 are operated to apply the laser beam to the wafer 10. At the same time, the chuck table 34 is moved at a predetermined feed speed in the X direction, more specifically, in the leftward direction (forward direction) shown by the left point of a double-headed arrow X in FIG. 2. As a result, a modified layer is formed inside the wafer 10 along the target division line 12. When the other end of the target division line 12 reaches the position directly below the focusing means 241 by the movement of the chuck table 34 in the forward direction in the laser processing as mentioned above, the Y moving means 41 is operated to index the chuck table 34 in the Y direction by the pitch (e.g., 5000 μm) of the division lines 12, so that the other end of the next division line 12 adjacent to the previous target division line 12 is positioned directly below the focusing means 241. Thereafter, the laser beam LB is applied again from the focusing means 241 to the wafer 10 under the same laser processing conditions as those along the previous target division line 12. At the same time, the chuck table 34 is moved at a predetermined feed speed in the X direction, more specifically, in the rightward direction (backward direction) shown by the right point of the double-headed arrow X in FIG. 2. As a result, a modified layer is similarly formed inside the wafer 10 along this next division line 12. In this manner, the laser beam is scanned both in the forward direction and in the backward direction to form a modified layer along each division line 12.

For example, the processing conditions of the laser processing by the laser processing apparatus 2 are set as follows:

Wavelength: 1064 nm
Repetition frequency: 80 kHz
Average power: 3.2 W
Pulse width: 4 ns
Feed speed: 500 mm/second
Index amount: 5000 μm After finishing the laser processing along one of the division lines 12, the wafer 10 is indexed in the Y direction by a predetermined amount (e.g., 5000 μm in this preferred embodiment) to similarly perform the laser processing along the next division line 12. Accordingly, as far as the devices 14 are formed on the wafer 10 as designed and the wafer 10 is indexed by the predetermined amount, the focal position of the laser beam LB to be applied from the focusing means 241 is set at the center of the next division line 12. However, while the laser processing is repeated along the plural division lines 12 on the wafer 10, the minute expansion in the wafer 10 along each division line 12 is accumulated to cause the possibility that the focal position of the laser beam may be gradually deviated in the Y direction. To cope with this problem, the control means 20 instructs the second imaging means 27 to image the next division line 12 and the device 14 adjacent thereto during the laser processing along this next division line 12 after indexing the wafer 10. Accordingly, the strobe light sources of the ring-shaped illuminating means 271 emit light to image the next division line 12 and the device 14 adjacent thereto on the wafer 10. A still image obtained by the second imaging means 27 is output to the control means 20. According to the still image (see FIG. 3B) displayed on the screen of the display means 9, the distance between the center line CL and the characteristic point 121 is detected to obtain the Y coordinate of the characteristic point 121, i.e., the detected value Y1 (=54 μm) for the Y coordinate of the characteristic point 121. Thereafter, this detected value Y1 for the Y coordinate of the characteristic point 121 is output to the control means 20 (step S2).

After obtaining the detected value Y1 for the Y coordinate of the characteristic point 121 as mentioned above, the deviation detecting section in the control means 20 detects the amount of deviation of the detected value Y1 from the reference value Y0 previously stored in accordance with the following equation.

$$\Delta Y = |Y0 - Y1| \quad (1)$$

After detecting the Y coordinate Y1 of the characteristic point 121, the determining section in the control means 20 determines whether or not the amount of deviation, ΔY (=|60 μm−54 μm|=6 μm) calculated above in Eq. (1) is greater than an allowable value (5 μm) (step S3). If the deviation amount ΔY is not greater than the allowable value (the answer in step S3 is No), the program returns to step S2 and the laser processing is continued. Further, every time the indexing is performed, the amount of deviation of the characteristic point 121 is detected by the deviation detecting section, and the steps S2 and S3 are repeated. If the deviation amount ΔY is greater than the allowable value (the answer in step S3 is Yes), the program proceeds to step S4, in which the index amount in next indexing the wafer 10 is corrected by the deviation amount ΔY (=Y0−Y1=6 μm) to obtain a new index amount (=5000 μm+6 μm). Accordingly, in performing the next indexing, the detected value for the Y coordinate of the characteristic point 121 becomes 60 μm, thus restoring the reference position. After correcting the index amount in step S4 and performing the laser processing along the current division line 12, the original index amount (=5000 μm) is used in next indexing the wafer 10.

Figure 4:
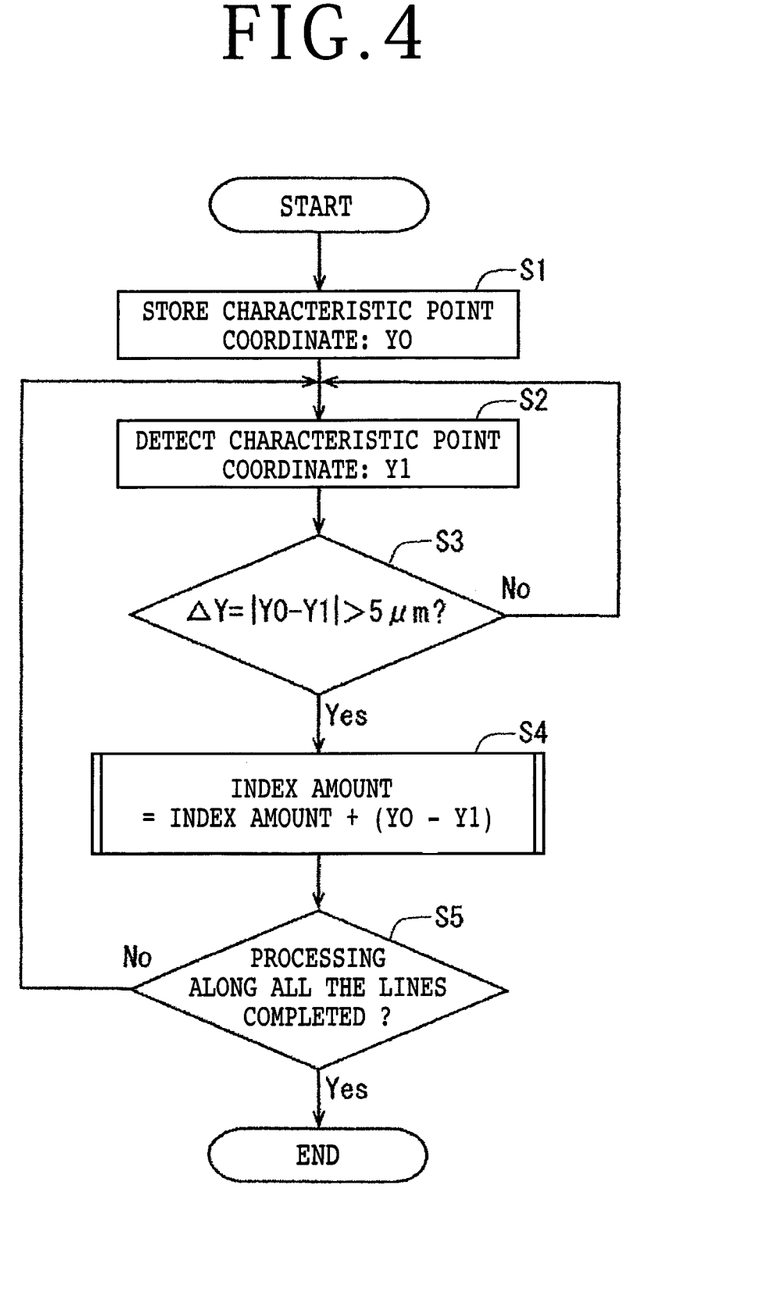
FIG. 4 is a flowchart showing the operation of the control means shown in FIG. 2.

After executing the step S4, the program proceeds to step S5, in which it is determined whether or not the laser processing has been completed along all of the division lines 12. If the answer in step S5 is Yes, this program is ended. If the answer in step S5 is No, the program returns to step S2 and then repeatedly executes steps S2 to S5. The control shown by the flow chart in FIG. 4 is periodically executed as interrupt control to the program for executing the laser processing control. Accordingly, when the laser processing control is ended, the interrupt control shown in FIG. 4 is also ended.

As described above, the index amount is corrected so that the detected value for the Y coordinate of the characteristic point 121 may become less than or equal to the allowable value in the laser processing apparatus according to the present invention. Accordingly, even when the wafer 10 is expanded by the laser processing, the focal position of the laser beam LB can be accurately set in the wafer 10 at a predetermined position in the lateral direction of each division line 12. Further, the wafer 10 is imaged by using the strobe light sources of the ring-shaped illuminating means 271 included in the second imaging means 27. Accordingly, even while the wafer 10 held by the holding means 6 and the focusing means 241 are relatively being moved in the X direction, a good still image of the division lines 12 and the devices 14 can be obtained to thereby improve the productivity.

The present invention is not limited to the above preferred embodiment, but various modifications may be made without departing from the scope of the present invention. For example, while the first imaging means 26 for performing the alignment step and the second imaging means 27 for detecting the Y coordinate of the characteristic point 121 are separately provided in this preferred embodiment, the second imaging means 27 may function also as the alignment means for performing the alignment step. In this case, the first imaging means 26 may be eliminated.

Further, while the Y coordinate of the characteristic point 121 is detected every time the laser processing is performed along each division line 12 in the above preferred embodiment, the present invention is not limited to this configuration. For example, the Y coordinate of the characteristic point 121 may be detected every time the indexing is performed a predetermined number of times and the laser processing is performed along an arbitrary one of the division lines 12.

Further, while the ring-shaped illuminating means 271 is provided on the outer circumference of the case 27a at its lower end in the second imaging means 27 in the above preferred embodiment, the present invention is not limited to this configuration. For example, the ring-shaped illuminating means 271 may be replaced by a half mirror provided in the case 27a at its middle portion. In this case, strobe light is applied from a strobe light source to the half mirror. The strobe light reflected on the half mirror is emerged from the case 27a and applied to the wafer 10. The strobe light reflected on the wafer 10 is transmitted through the half mirror as return light, which is imaged by the imaging element 27b.

Further, while the characteristic point 121 present in each device 14 formed on the wafer 10 is a characteristic pattern formed by the combination of minute elements constituting each device 14 in the above preferred embodiment, the present invention is not limited to this configuration. For example, a mark having a characteristic shape may be provided at a predetermined position in each device 14 by printing or the like. In this case, this mark is used as a characteristic point, and the Y coordinate of this mark is detected to thereby detect the amount of deviation.

Further, while the laser processing is performed to form a modified layer inside the wafer 10 along each division line 12 by applying a laser beam to the back side 10b of the wafer 10 in the above preferred embodiment, wherein the wafer 10 is expanded by this laser processing and the amount of deviation of the characteristic point 121 due to this expansion is detected, the present invention is not limited to this configuration. For example, the present invention is also applicable to the laser processing by ablation such that a laser beam is applied to the front side 10a of the wafer 10 along each division line 12 or applicable to the laser processing for forming shield tunnels in the wafer 10 along each division line 12.

Further, while the amount of deviation of the characteristic point 121 is detected and the index amount is corrected according to the control flow shown in FIG. 4 in this preferred embodiment, this control flow is merely illustrative. That is, various modifications of the control flow may be made without departing from the scope of the present invention.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
    a chuck table for holding a wafer having a plurality of devices formed on a front side so as to be separated by a plurality of crossing division lines;
    laser beam applying means for applying a laser beam to said wafer held on said chuck table;
    imaging means for imaging said wafer held on said chuck table;
    X moving means for relatively feeding said chuck table and said laser beam applying means in an X direction;
    Y moving means for relatively indexing said chuck table and said laser beam applying means in a Y direction perpendicular to said X direction; and
    control means for controlling said chuck table, said laser beam applying means, said imaging means, said X moving means, and said Y moving means;
    said laser beam applying means including
    a laser oscillator for oscillating said laser beam, and
    focusing means for focusing said laser beam oscillated from said laser oscillator and applying said laser beam to each division line of said wafer held on said chuck table,
    said control means including
    a coordinate storing section for storing the Y coordinate of a characteristic point having a predetermined positional relation to each division line as a reference value with respect to a reference position where the focal point of said laser beam to be focused by said focusing means coincides with a predetermined position on each division line in said Y direction,
    a deviation detecting section for detecting the amount of deviation of the Y coordinate of said characteristic point imaged by said imaging means after indexing each division line of said wafer in said Y direction by the operation of said Y moving means, from the Y coordinate stored as said reference value in said coordinate storing section, and
    a determining section for determining whether or not the amount of deviation detected by said deviation detecting section is greater than an allowable value,
    wherein when said determining section determines that the amount of deviation is greater than said allowable value, an index amount as the amount of indexing each division line is corrected by the amount of deviation in said Y direction by the operation of said Y moving means, and the index amount corrected is used in next indexing said wafer.

2. The laser processing apparatus according to claim 1, wherein said deviation detecting section is operated during laser processing while said wafer held on said chuck table and said focusing means are being relatively moved in said X direction.

3. The laser processing apparatus according to claim 2, wherein said imaging means includes an imaging element, an objective lens, and a strobe light source for forming a still image of said wafer, said still image being formed during laser processing while said wafer held on said chuck table and said focusing means are being relatively moved in said X direction.

4. The laser processing apparatus according to claim 1, wherein said laser beam to be applied from said focusing means is a laser beam having a transmission wavelength to said wafer, and said laser beam is applied to said wafer along each division line in the condition where the focal point of said laser beam to be focused by said focusing means is set inside said wafer, thereby forming a modified layer inside said wafer along each division line.

5. The laser processing apparatus according to claim 4, wherein said wafer is held on said chuck table in the condition where a back side of said wafer is exposed, and said characteristic point formed on the front side of said wafer is imaged through the back side of said wafer by said imaging means.

6. The laser processing apparatus according to claim 1, wherein said deviation detecting section is operated during laser processing along an arbitrary one of said division lines.

7. The laser processing apparatus according to claim 1, wherein said deviation detecting section is operated during laser processing along each division line.

8. The laser processing apparatus according to claim 1, further comprising:
    alignment means for imaging said wafer held on said chuck table and making the focal position of said laser beam to be focused by said focusing means coincide with the center of each division line in said Y direction, said imaging means functioning also as said alignment means.

\* \* \* \* \*